United States Patent
Frei et al.

(10) Patent No.: US 8,768,632 B2
(45) Date of Patent: Jul. 1, 2014

(54) METHOD AND APPARATUS FOR THE FILLING OF TARGET CONTAINERS

(75) Inventors: Pascal Frei, Schänis (CH); Guido Schuster, Stäfa (CH); Markus Kottmann, Zürich (CH)

(73) Assignee: Mettler-Toledo AG, Greifensee (CH)

( * ) Notice: Subject to any disclaimer, the term of this patent is extended or adjusted under 35 U.S.C. 154(b) by 799 days.

(21) Appl. No.: 13/032,953

(22) Filed: Feb. 23, 2011

(65) Prior Publication Data

US 2011/0172934 A1   Jul. 14, 2011

Related U.S. Application Data

(63) Continuation of application No. PCT/EP2009/060524, filed on Aug. 13, 2009.

(30) Foreign Application Priority Data

Aug. 25, 2008 (EP) .................................. 08162902

(51) Int. Cl.
*G01F 1/00* (2006.01)
*G06F 11/00* (2006.01)

(52) U.S. Cl.
USPC ................ 702/45; 702/46; 702/188; 702/189

(58) Field of Classification Search
USPC ...................... 702/45–50, 182–189
See application file for complete search history.

(56) References Cited

U.S. PATENT DOCUMENTS

| 4,762,252 | A | * | 8/1988 | Hyer et al. ...................... 222/56 |
| 4,893,262 | A | * | 1/1990 | Kalata ............................ 700/305 |
| 6,987,228 | B1 | | 1/2006 | MacMichael et al. |
| 2009/0293986 | A1 | | 12/2009 | Blochlinger |

FOREIGN PATENT DOCUMENTS

| DE | 3910028 A1 | 10/1989 |
| WO | 01/33176 A1 | 5/2001 |

* cited by examiner

*Primary Examiner* — Phuong Huynh
(74) *Attorney, Agent, or Firm* — Standley Law Group LLP (57) ABSTRACT

A container is filled to a predetermined target mass of a free-flowing substance with the help of a device that dispenses measured doses of the substance. The device has a valve for variably adjusting the mass flow rate of the substance from a reservoir into the container. The device further includes a means for measuring the elapsed time from the beginning of the filling process, a balance for determining the mass of the substance in the container, and a controller unit for controlling the valve. The controller unit includes an adjustment module, and a memory unit wherein a desired mass flow rate is stored. At an elapsed time, if the mass flow rate is smaller or larger than the desired mass flow rate the flow rate is respectively increased or decreased by a flow rate adjustment.

20 Claims, 4 Drawing Sheets

METHOD AND APPARATUS FOR THE FILLING OF TARGET CONTAINERS

CROSS-REFERENCE TO RELATED TO APPLICATIONS

This application is a continuation under 35 USC §120 of PCT/EP2009/060524, filed 13 Aug. 2009, which is in turn entitled to benefit of a right of priority under 35 USC §119 from European patent application 08 16 2902.4, filed 25 Aug. 2008. The content of each of the applications is incorporated by reference as if fully recited herein.

TECHNICAL FIELD

The present invention relates to a method and an apparatus serving to fill target containers with a predetermined target quantity of a free-flowing substance out of a reservoir.

BACKGROUND

Filling devices of this kind are used in particular in the dispensing of small dosage amounts as required for example in the field of pharmaceuticals. The target containers are often set on a balance in order to weigh the amount of substance delivered by the dosage-dispensing device, so that the substance can subsequently be further processed in accordance with given instructions.

The substance to be dispensed is held for example in a source container or reservoir which is equipped with a dispensing head. It is desirable if the substance to be dispensed is delivered to the outside through an opening of the dosage-dispensing device, so that at the end of the filling process a predetermined target mass of substance will have been received by the target container. It is of importance here that the actual amount of mass in the target container agrees as accurately as possible with the predetermined target mass. It is further important that the filling process can be performed as rapidly as possible.

Known from the existing state of the art are dosage-dispensing methods which are based on a volumetric measurement of the amount of substance delivered. For a substance of density $\rho$, a valve with a variable aperture cross-section A and, associated with these parameters, a resultant outflow velocity u of the substance, the mass $m_z$ of the substance in the target container is obtained from the equation $$m_z = \int_{t_{open}}^{t_{close}} \dot{m}(t) dt$$

$$= \int_{t_{open}}^{t_{close}} \rho \dot{V}(t) dt$$

$$= \int_{t_{open}}^{t_{close}} \rho (Au)(t) dt$$

$$= \int_{t_{open}}^{t_{close}} \rho A(t) u(A, h, d, \ldots) dt$$

In particular the outflow velocity u is subject to many factors such as for example the cross-sectional area A of the valve aperture, the hydrostatic pressure resulting from the fill height h of the substance in the reservoir, and the rheological properties of the substance such as for example the grain size d of the powder. The rheological properties are often very complex and are subject to factors which are not known with any degree of precision. It is for example difficult to take the flow retardation into account which occurs in Bingham media or powders at the beginning of the flow movement. Particularly in the filling of pulverous substances, factors such as for example grain size, moisture content, and surface properties of the individual particles, have a major influence.

In U.S. Pat. No. 4,893,262 a controller system for the filling of containers is disclosed. The system is optimized in a process that extends over several filling cycles, wherein the mass flow is optimized from one cycle to the next and the filling time is adjusted until the dispensed mass agrees as accurately as possible with the predetermined target mass. This system is used primarily for the filling of large quantities where the requirements concerning accuracy are considerably lower than for the system of the present invention. The fact that the optimization extends over several cycles represents a further problem, as the predetermined target mass is actually attained with the required accuracy only after several trial cycles. The substance dispensed during these trial cycles cannot be used anymore, since it could have been contaminated in the process of dispensing and subsequent removal from the target container. This is a decisive disadvantage especially when the substances being dispensed are expensive.

A method and apparatus to dispense a small mass of particles accurately and reproducibly are disclosed in U.S. Pat. No. 6,987,228 B1. The apparatus includes a controller unit which serves to control the amount of energy imparted to a sieve which holds the particles to be dispensed. Energizing the sieve has the effect that a small quantity of the particles in the sieve will fall on a balance that is arranged below the sieve. Based on the weight measured by the balance, the controller unit controls the amount of energy that is applied to the sieve. The amount of energy being introduced can be controlled as a function of the amount of mass that remains to be dispensed, whereby the outflow rate of the particles can be varied. This arrangement has the problem that with the use of the sieve, only substances in powder form can be dispensed. For other free-flowing substances, particularly for liquids, this method is not suitable. Even when pulverous substances are being dispensed, there are drawbacks inherent in this method, as different sieves have to be used depending on the grain size of the substance. The essential disadvantage concerns the control of the energy supplied to the sieve as a function of the weighing signal. Because of the time delay in the response of the balance, the filling process would have to be performed at a slow enough speed to allow enough time for the balance to respond. As a result, the filling process would take a very long time.

A system to control the filling of containers is disclosed in U.S. Pat. No. 4,762,252. To determine the mass flow rate during the filling process, the change in the weight of the reservoir is measured. The mass flow rate that is determined in this way is compared to a desired flow rate. If the measured flow rate deviates too strongly from the desired flow rate, the mass flow rate is adjusted accordingly. The system described in this reference is suitable for dispensing about 25 to 50 kilograms per hour. In the filling of small quantities of the sizes required in the field of pharmaceuticals, a high level of accuracy is required and small measurement inaccuracies can have a significant influence on the fill mass. At the same time, the filling process should take as little time as possible.

It is therefore an object of the present invention to provide a method and an apparatus serving to accurately and reproducibly dispense a predefined small fill quantity of a free-flowing substance and having the attributes of being simple, fast and accurate.

SUMMARY

This task is solved with a method and an apparatus having the features described in the disclosed embodiments or the claims.

According to the disclosed methods and with the disclosed embodiments of the apparatus, a target container is filled with a predetermined target mass $m_z$ of a free-flowing substance from a reservoir with the help of a dispensing device for the filling of measured doses of the substance into the target container. The dosage-dispensing device has a valve which allows a variable adjustment of the mass flow rate $\dot{m}$ from the reservoir into the target container. The dosage-dispensing device further includes a means for measuring the elapsed time t from the beginning of the filling process, a balance for determining the mass m of the substance in the target container, and a controller unit with a valve control module for controlling the valve. The controller unit includes an adjustment module, wherein a desired mass flow rate $\dot{m}_\star$ stored in the adjustment module. If at a point in time t the mass flow rate $\dot{m}(t)$ is smaller than the desired mass flow rate $\dot{m}_\star$, the flow rate $\dot{m}_\star$ is increased by a mass flow rate adjustment $$d\dot{m}=\dot{m}_\star-\dot{m}(t),$$

and if the mass flow rate $\dot{m}(t)$ is larger than the desired mass flow rate $\dot{m}_\star$, the flow rate $\dot{m}_\star$ is decreased by a mass flow rate adjustment $$d\dot{m}=\dot{m}(t)-\dot{m}_\star.$$

It is advantageous if several different parameters enter into the determination of the desired mass flow rate $\dot{m}_\star$.

One of these parameters is the delay interval $\tau$. The delay interval $\tau$ represents the time interval from the arrival of the mass on the balance until the mass value is indicated on the balance. The delay interval $\tau$ is determined through measurements. It has been found that in the majority of cases the delay interval $\tau$ depends on the characteristics of the balance. In addition, parameters of the ambient environment have an influence on the delay interval $\tau$. For example, low-frequency vibrations and/or tremors will cause an increase of the delay interval $\tau$. This means that the primary factors entering into the delay interval $\tau$ are the balance-specific measurement delay and environmental parameters. Physical properties of the substance to be dispensed play only a secondary part.

In order to ensure that the mass dispensed into the target container does not exceed the limit, one can let the delay interval $\tau$ enter into the determination of the desired mass flow rate $\dot{m}_\star$. The rule to be followed here is that the delay interval $\tau$ should be in inverse proportion to the desired mass flow rate $\dot{m}_\star$, i.e.

$$\dot{m}_\star \propto \frac{1}{\tau}.$$

A further parameter that should enter into the determination of the desired mass flow rate is the mass tolerance $m_T$. The mass tolerance $m_T$ defines the maximally allowable deviation by which the mass m that is in the target container at the end of the dosage-dispensing process may differ from the target mass $m_z$. In other words, the mass m that is in the target container at the end of the dosage-dispensing process must lie within the interval $$m_z-m_T<m<m_z+m_T.$$

If the mass tolerance $m_T$ is large, the desired outcome of the end mass m being within the given tolerance $m_T$ can be assured even in the case where a large mass flow rate $\dot{m}_\star$ is desired. On the other hand, if the mass tolerance $m_T$ is small, the desired mass flow rate $\dot{m}_\star$ needs to be selected small enough to ensure that the mass m ends up within the given tolerance $m_T$. This leads to the requirement that the desired mass flow rate $\dot{m}_\star$ should be in proportion to the mass tolerance $m_T$, i.e.

$$\dot{m}_\star \propto m_T.$$

If the end mass m of the substance dispensed into the target container exceeds the target mass $m_z$ by more than the mass tolerance $m_T$, i.e. if $$m>m_z+m_T,$$

this is considered an overshoot. Overshooting the tolerance $m_T$ needs to be strictly prevented, as the excess amount of substance delivered cannot be removed again from the target container without great difficulty. Also, in the process of removing the substance from the target container it is possible that contaminations will occur, a risk that needs to be avoided.

In order to safely avoid an overshooting of the mass received by the target container, the amount of mass that is dispensed into the target container during the delay interval $\tau$ should be smaller than the tolerance $m_T$, i.e.

$$\dot{m}_\star \tau \leq m_T.$$

Consequently, the mass flow rate has to be smaller than or equal to the tolerance $m_T$ divided by the delay interval $\tau$.

$$\dot{m}_\star \leq \frac{m_T}{\tau}$$

The maximum allowable value for the desired mass flow rate $\dot{m}_\star$ is therefore $$\dot{m}_\star = \frac{m_T}{\tau}.$$

By staying below this maximum value, one ensures that the mass m in the target container at the end of the filling process is within the predefined tolerance range.

As the delay interval $\tau$ can change during a filling process, depending on the environmental parameters, this change in the delay interval $\tau$ can be used to make an adjustment in the desired mass flow rate $\dot{m}_\star$.

The adjustment module compares the desired mass flow rate $\dot{m}_\star$ to the actual mass flow rate $\dot{m}(t)$ and if a difference is found between the two quantities, the adjustment module adapts the actual mass flow rate $\dot{m}(t)$ to the desired mass flow rate $\dot{m}_\star$. To ensure that the desired mass flow rate $\dot{m}_\star$ is maintained over the entire filling process, the adjustment module is used repeatedly. It is particularly advantageous to repeat the operation of the adjustment module after equal time intervals.

To prevent the system from becoming unstable, the mass flow rate $\dot{m}$ should not be changed too rapidly. It is therefore advantageous to let the previous mass flow rate $\dot{m}_{old}$ enter into the calculation of the new mass flow rate $\dot{m}_{new}$, in accordance with this equation:

$$\dot{m}_{new} = (1-\alpha)\dot{m}_{old} + \alpha(\dot{m}_{old} - d\dot{m}).$$

The factor $\alpha$ is a weight factor which can take on any desired value between zero and one, i.e. $\alpha \in (0,1)$. This has the effect that the mass flow rate $\dot{m}$ will change more slowly.

One possibility to prevent an overshooting of the target mass $m_z$ is to calculate the actual mass $\tilde{m}(t)$ that is present in the target container based on the current mass flow rate $\dot{m}(t)$, the weighing signal $m(t)$ measured by the balance, and the delay interval $\tau$, using the relationship $$\tilde{m}(t) = m(t) + \tau \cdot \dot{m}(t).$$

Based on the calculated amount $\tilde{m}(t)$ for the actual mass that is present in the target container, the closing of the valve can be started at the right time and an overshooting of the target mass $m_z$ can thereby be avoided.

The risk of overshooting the target mass $m_z$ is further reduced, if the desired mass flow rate $\dot{m}_\star$, and consequently also the actual mass flow rate $\dot{m}(t)$, is lowered towards the end of the filling process.

The disclosed methods and the disclosed embodiments of the apparatus find application in particular in the filling of pulverous or liquid substances. The free-flowing substances normally have complex rheological properties and are in most cases of a non-Newtonian nature. The desired target mass is typically in a range between 0.5 mg and 5000 mg. However, it is also possible to dispense smaller or larger dosage quantities with this method.

According to an advantageous embodiment, the valve has an outlet orifice of circular cross-section and a shutter element, wherein the outlet orifice and the shutter element are arranged on a common axis. The shutter element, which has the mobility relative to the housing to rotate about the common axis and to slide in translatory movement along the common axis, can be driven out of, and retracted back into, the outlet orifice. The shutter element has a cylindrical shutter portion and an outlet passage portion, so that by a translatory movement of the shutter element equal to the length L of the latter the valve can be opened and closed. The outlet passage portion of the shutter element is designed so that the substance can flow through the outlet passage portion if the translatory displacement is larger than a minimum translatory displacement $L_{min}$, and smaller than a maximum translatory displacement $L_{max}$. If the translatory displacement is smaller than the minimum translatory displacement $L_{min}$, or larger than the maximum translatory displacement $L_{max}$, the outlet orifice is closed off by the cylindrical shutter portion and the substance cannot pass through the outlet passage portion.

The mass flow rate $\dot{m}$ is directly correlated with the translatory displacement L of the shutter element.

To arrive at the actual mass flow rate $\dot{m}$ one can also make use of the weighing signal $m(t)$ by determining the first time derivative of the weighing signal $$\dot{m}(t) = \frac{m(t) - m(t - \Delta t)}{\Delta t}.$$

The time difference $\Delta t > 0$ can be chosen arbitrarily. However, attention should be given to choosing $\Delta t$ sufficiently large, so that statistical fluctuations of the weighing signal are smoothed out and the values for $\dot{m}$ will not excessively fluctuate as a result. Excessive fluctuations can lead to instability of the dosage-dispensing process. In determining the mass flow rate $\dot{m}(t)$, it is preferred to use discrete, uniform time intervals $\Delta t$. From the time $t_1$ when the valve is opened, the mass flow rate $\dot{m}(t_i)$ at the times $t_i$ which follow each other in uniform steps $\Delta t$ according to the sequence $$t_i = t_1 + i\Delta t$$

is determined with the help of the following equation:

$$\dot{m}(t_i) = \frac{m(t) - m(t - n\Delta t)}{n\Delta t}, n = 1, 2, 3, \ldots$$

Ideally, n is a positive integer between 2 and 10. If a larger value for n is used, the mass flow rate $\dot{m}(t_i)$ is determined over a larger time interval, whereby on the one hand statistical fluctuations of the weighing signal are smoothed out. On the other hand, if a large time interval is used, the value of $\dot{m}(t_i)$ is relatively slow to respond, so that a change in the mass flow rate will be detected relatively late.

Based on the calculated mass flow rate ṁ(t), the deviation $$d\dot{m} = \dot{m}_\star - \dot{m}(t)$$

from the desired mass flow rate ṁ$_\star$ can be determined, and the mass flow rate ṁ(t) can be adjusted accordingly.

It is further of advantage that the valve is opened and closed by moving the shutter element in translatory steps of equal magnitude ΔL.

Ideally, in the filling process a determination is made of the minimum translatory displacement $L_{min}$, which allows the substance to flow and/or of the maximum translatory displacement $L_{max}$. It is further practical to determine the actual mass that is present at the end of the filling process. These parameters can be stored and used by the controller unit in subsequent fill cycles. Thus, these parameters need to be determined only once, and subsequent fill cycles can be performed faster. The parameter values of preceding fill cycles can be stored in a memory unit, in particular an RFID (Radio Frequency Identification) tag and used in later fill cycles. It is particularly advantages to affix the RFID tags to the pertinent reservoir, as this will ensure a direct connection between the substance in the reservoir and the data stored in the RFID tag. However, one could also use other memory storage media.

Ideally, in a procedure that is used only in the first filling cycle, the valve is opened in translatory stepwise movements ΔL of the shutter element until the substance begins to flow, whereby the minimum translatory displacement $L_{min}$, is defined. To determine the maximum translatory displacement $L_{max}$, the shutter element is first opened by an amount $L_{min}$+ΔL, and then the movement is continued in translatory steps of equal magnitude ΔL until the substance ceases to flow, whereby the maximum translatory displacement $L_{max}$ is defined. Once the minimum translatory displacement $L_{min}$, and the maximum translatory displacement $L_{max}$ are known, the shutter element can be opened and closed in any way desired.

Advantageously, the outlet passage area of the shutter element has a variable aperture cross-section A. Thus, the mass flow rate ṁ of the stream of substance passing through the valve is directly correlated to the position of the shutter element of the valve. Ideally, the length L of the translatory displacement of the shutter element is directly correlated to the aperture cross-section of the valve, i.e. A=A(L). Depending on the design of the valve, there is a direct proportional relationship between the translatory displacement L of the shutter element, the aperture cross-section A, and the mass flow rate ṁ:

$$\Delta L \propto \Delta A \propto \dot{m}^3.$$

Based on the geometric design of the shutter element, the dependence of the flow rate on the translatory displacement L is expressed by a cubic function and has been determined experimentally. A change of the geometry of the shutter element would also lead to a change in the relationship between the translatory displacement L and the mass flow rate ṁ.

However, a direct proportionality of this kind is normally not achievable in practical reality, as material properties such as for example grain size, delayed start of the flow movement, or similar factors act against a direct proportionality. However, it can normally be taken as a rule that with a larger aperture cross-section there will be a larger mass flow rate.

It is advantageous to use a shutter element which can be set into rotation with a variable angular velocity ω, wherein the angular velocity ω correlates directly to the rate ṁ of the mass flow through the valve.

As a further advantage, the valve is equipped with an impact mechanism delivering a tapping action of a variable tapping frequency F against the already open valve. In this case the tapping frequency F correlates directly to the mass flow rate ṁ through the valve, and an increase of the tapping frequency F leads to a larger mass flow rate ṁ. The tapping strikes can be directed parallel as well as transverse to the axial direction of the shutter element.

Furthermore, the taps can strike against the shutter element of the valve and/or against the housing of the valve.

With both the rotary movement and with the tapping action one gains the benefit, that a clogging of the valve and/or the formation of powder bridges can thereby be counteracted. In this way, the free-flowing property of the powder can be preserved or even enhanced.

The controller unit can be realized in part or in its entirety as a computer-based system.

BRIEF DESCRIPTION OF THE DRAWINGS

The method and the apparatus for the filling of target containers are hereinafter described through examples which are illustrated schematically in the drawings, wherein FIG. 1 schematically represents the apparatus for the filling of target containers in accordance with the disclosed embodiments.

DETAILED DESCRIPTION OF PREFERRED EMBODIMENTS

Figure 1:
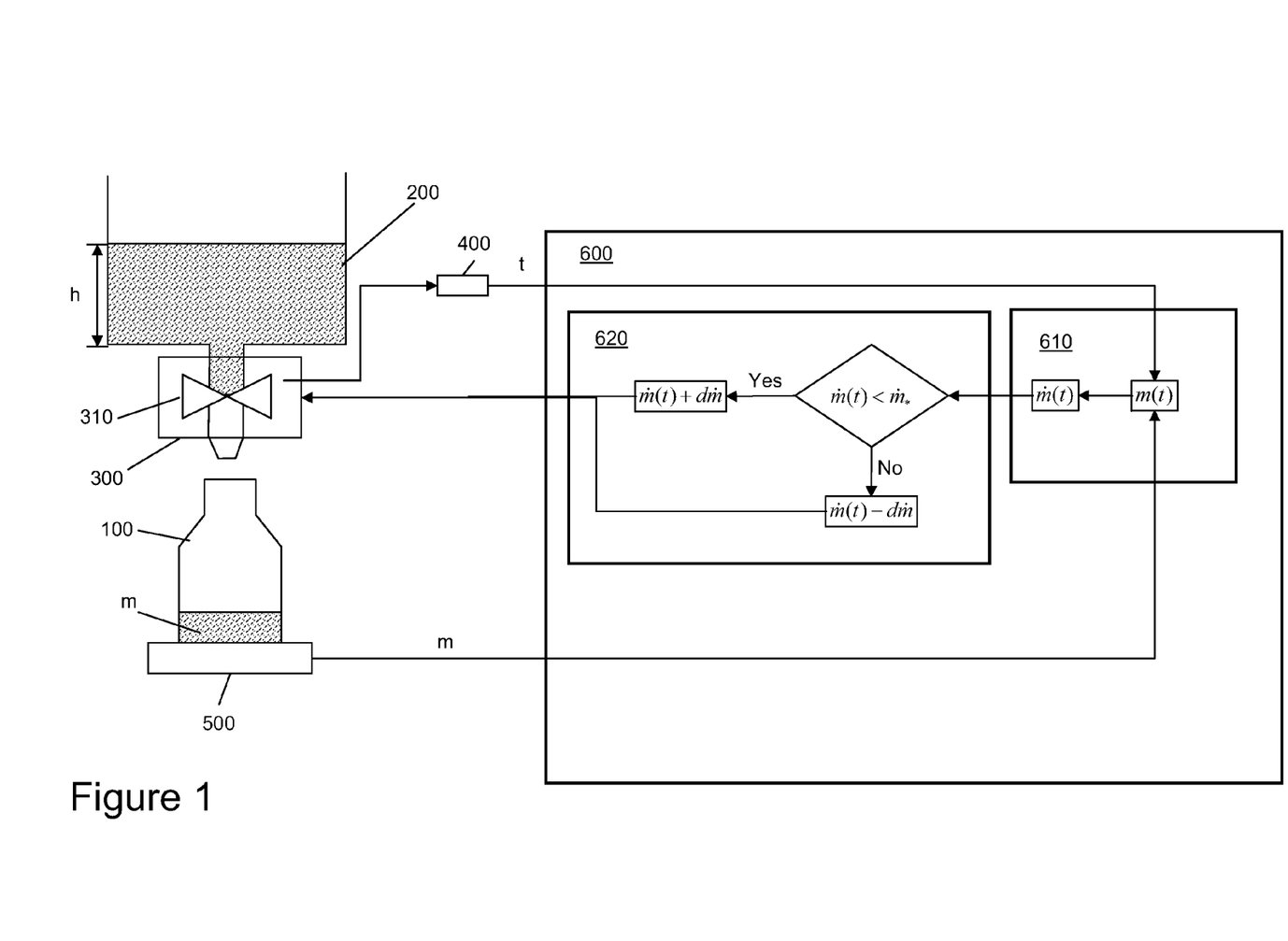

FIG. 1 shows a target container 100 which can be filled by way of a dosage-dispensing device 300 with a substance that is stored in the reservoir 200 up to a fill height h. The dosage-dispensing device 300 is tied to a timekeeping device 400 to measure the time t which has elapsed from the beginning of the filling process, wherein the time that was measured can be transmitted to a controller unit 600. The target container 100 is arranged on a balance 500, so that the weight of the substance in the target container 100 can be measured. The weighing signal, i.e. a signal representing the mass m, can likewise be transmitted to the controller unit 600. In the mass flow calculation module 610 of the controller unit 600, the time signal and the mass signal are tied to each other to establish the mass m(t) at any given time t measured from the beginning of the dosage-dispensing process.

From two mass values m(t−Δt) and m(t) which were determined at two consecutive points in time t and t+Δt, the mass flow rate can be determined as $$\dot{m}(t) = \frac{m(t) - m(t - \Delta t)}{\Delta t}.$$

The aim in this process is to fill the target container 100 at a desired mass flow rate $\dot{m}_\star$ until the desired amount of mass is present in the target container. Ideally, the desired mass flow rate $\dot{m}_\star$ meets the condition $$\dot{m}_\star < \frac{m_T}{\tau},$$

wherein $m_T$ represents the tolerance value for the discrepancy between the desired target weight and the actual end weight, and τ represents the delay interval of the balance. The delay interval τ is a balance-specific parameter which is independent of the physical properties of the substance to be dispensed. The delay interval τ can be determined prior to the first fill cycle and stored in the controller unit 600.

The delay interval time τ depends on the technical characteristics of the balance 500 and on the parameters of the ambient environment. The ambient parameters can change over the course of a filling process, and this can also cause a change of the delay interval τ. This change of the delay interval τ can be determined continuously, and the desired mass flow rate $\dot{m}_\star$ can be adapted in response to the change of the delay interval τ.

The calculated mass flow rate $\dot{m}(t)$ is passed on to an adjustment module 620 where the mass flow rate $\dot{m}(t)$ that has been determined from the measurement values is compared to the desired mass flow rate $\dot{m}_\star$. If the calculated mass flow rate $\dot{m}(t)$ is found to be smaller than the desired mass flow rate $\dot{m}_\star$, the mass flow rate $\dot{m}$ is increased by $d\dot{m}$, and if the calculated mass flow rate $\dot{m}(t)$ is found to be larger than the desired mass flow rate $\dot{m}_\star$, the mass flow rate $\dot{m}$ is decreased by $d\dot{m}$. After the adjustment, the actual mass flow rate $\dot{m}(t)$ should agree with the desired mass flow rate $\dot{m}_\star$. The adjustment module 620 sends the signal for the adjustment of the mass flow rate to the valve 310. The determination of the actual mass flow rate is performed repeatedly during the fill cycle and, if necessary, the mass flow rate $\dot{m}(t)$ is adjusted. The determination of the actual mass flow rate and/or the adjustment of the mass flow rate can be performed in equal time intervals.

Figure 2:
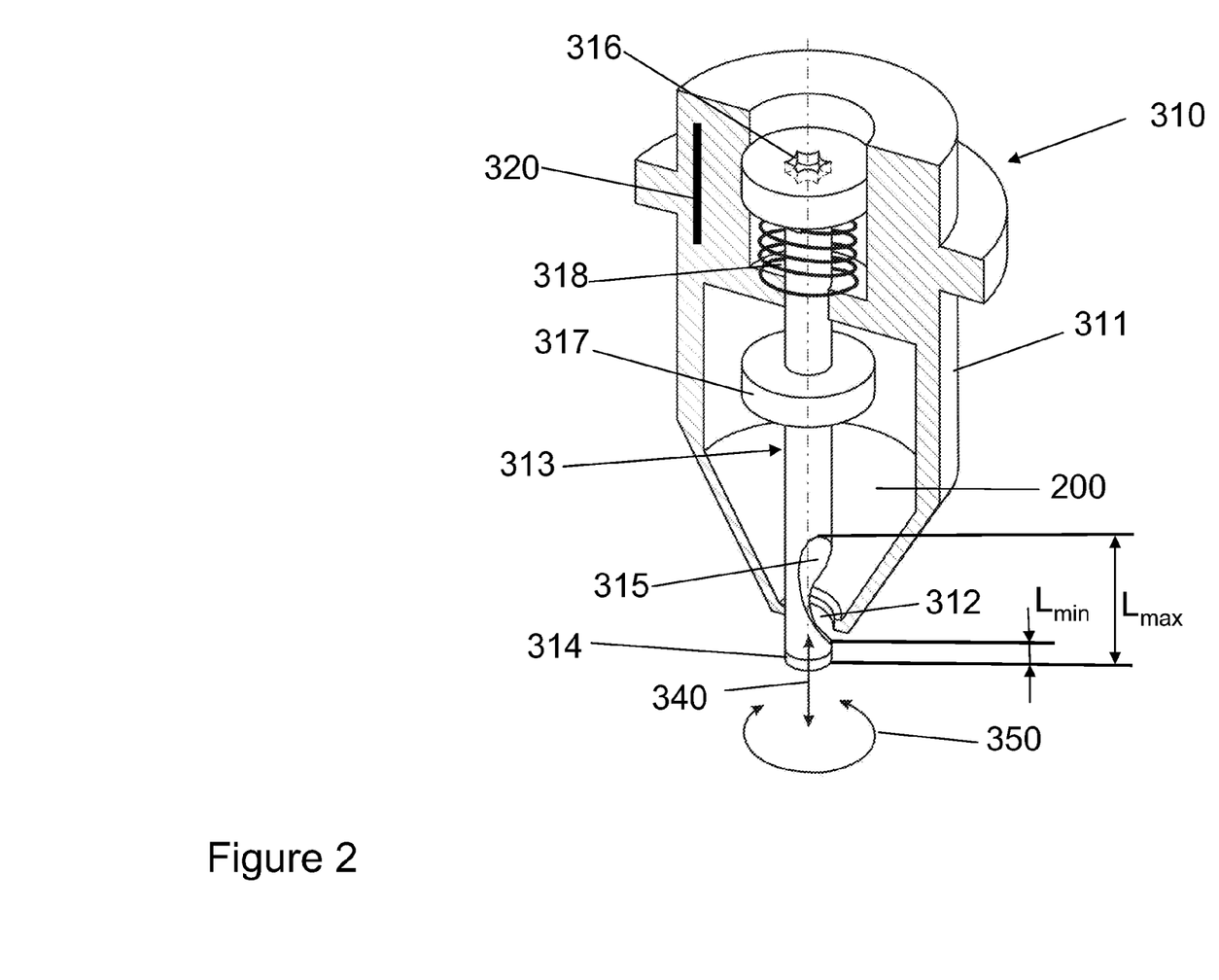
FIG. 2 shows a valve with a valve housing and a shutter element according to the disclosed embodiments.

FIG. 2 represents a valve 310 with a housing 311 and an outlet orifice 312 with a circular-shaped aperture cross-section. A shutter element 313 is arranged in the valve 310. The shutter element 313 has a cylindrical shutter portion 314 and an outlet passage portion 315. The outlet orifice 312 and the shutter element 313 are arranged on common axis, and the shutter element 313 has the mobility relative to the housing 311 to turn about the common axis (as indicated by the circular bidirectional arrow 350) as well as to slide in translatory movement along the common axis (as indicated by the straight bidirectional arrow 340). Thus, the shutter element 313 can slide out of, and back into, the outlet orifice 312. This rotation 350 or translatory movement 340 of the shutter element 313 occurs with the help of a drive source which is coupled to the shutter element 313 through a coupler element 316. A resetting element 318 is arranged between the valve housing 311 and the shutter element 313, which allows the shutter element 313 to be returned to a rest position. This resetting element 318 is preferably a shutter spring. The return travel of the resetting spring is delimited by a stop 317.

Between the shutter element 313 and the valve housing 311 there is a hollow space which serves as a reservoir 200 for the substance to be dispensed. A translatory movement 340 of the shutter element 313 opens the way so that the substance to be dispensed can pass from the reservoir 200 by way of the outlet passage portion 315 of the shutter element 313 and through the outlet orifice 312 into the target container 100.

The valve 310 includes a memory unit 320 to store data. In this memory unit 320 it is possible to store for example material properties of the substance to be dispensed, flow parameters from preceding filling processes, and/or balance-specific parameters such as for example the delay interval τ. The memory unit 320 is arranged on or in the valve housing 311.

Figure 3:
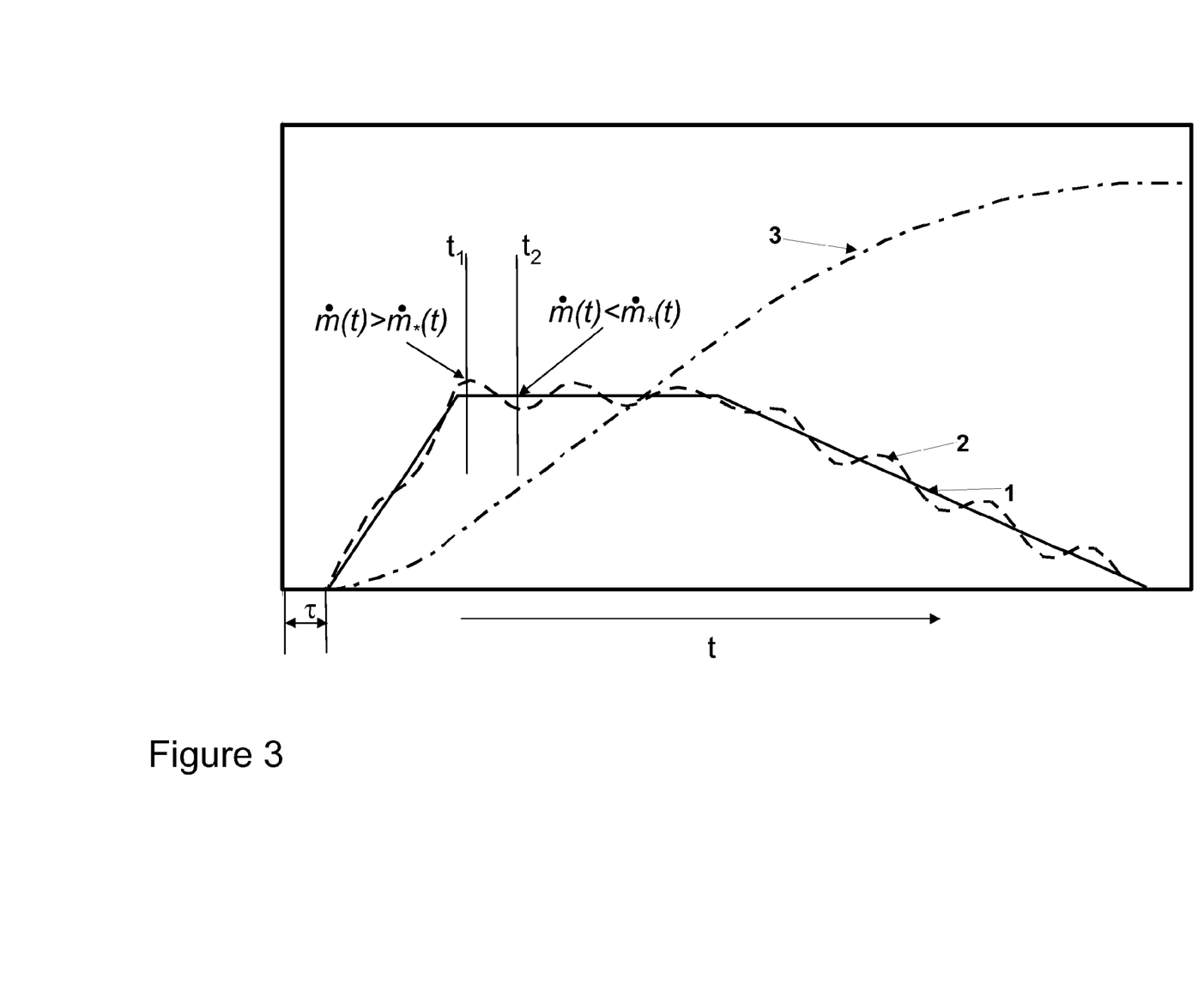
FIG. 3 shows graphs with an idealized time profile of the aperture cross-section and the resultant time profile of the mass flow rate.

FIG. 3 shows a graph 1 with a time profile of the desired mass flow rate $\dot{m}_\star$, a further graph 2 with a time profile of the mass flow rate $\dot{m}(t)$ of the filling process according to disclosed embodiments and a further graph 3 with the mass m(t) resulting from the mass flow rate $\dot{m}(t)$ of graph 2. There is a delay interval τ due to the delay between the times when the mass in the target container 100 reaches the amount m(t) and when the mass value is delivered by the balance 500 according to FIGS. 1 and 2. As soon as a mass is indicated by the balance 500, it is possible to determine the mass flow rate $\dot{m}(t)$. At the beginning of the filling process, the valve 310 is opened relatively fast, which has the result of a large mass flow rate $\dot{m}(t)$ and a steep rise of the mass m(t) after the initial delay interval τ. However, an aperture cross-section A that is too large leads to a large mass flow rate $\dot{m}(t)$, so that the target container 100 is filled rapidly, which entails the risk of overshooting the target mass $m_z$. It may therefore be advisable to slow down the filling process by reducing the desired mass flow rate $\dot{m}_\star$, which is accomplished by making the aperture cross-section A smaller as the end of the filling cycle approaches.

In a comparison of the actual mass flow rate $\dot{m}(t)$ against the desired mass flow rate $\dot{m}_\star$, if the actual mass flow rate $\dot{m}(t)$ is found to be larger than the desired mass flow rate $\dot{m}_\star$, the actual mass flow rate ṁ(t) is lowered by reducing the aperture cross-section A of the valve 310. On the other hand, if the comparison shows that the actual mass flow rate ṁ(t) is smaller than the desired mass flow rate ṁ$_*$, the actual mass flow rate ṁ(t) is raised by increasing the aperture cross-section A of the valve 310.

Towards the end of the filling process the aperture cross-section A of the valve is reduced, whereby the mass flow rate ṁ(t) is lowered. In this way, the mass m(t) in the target container 100 can approach the target mass m$_z$ slowly, whereby an overshooting of the target mass m$_z$ is prevented.

Figure 4:
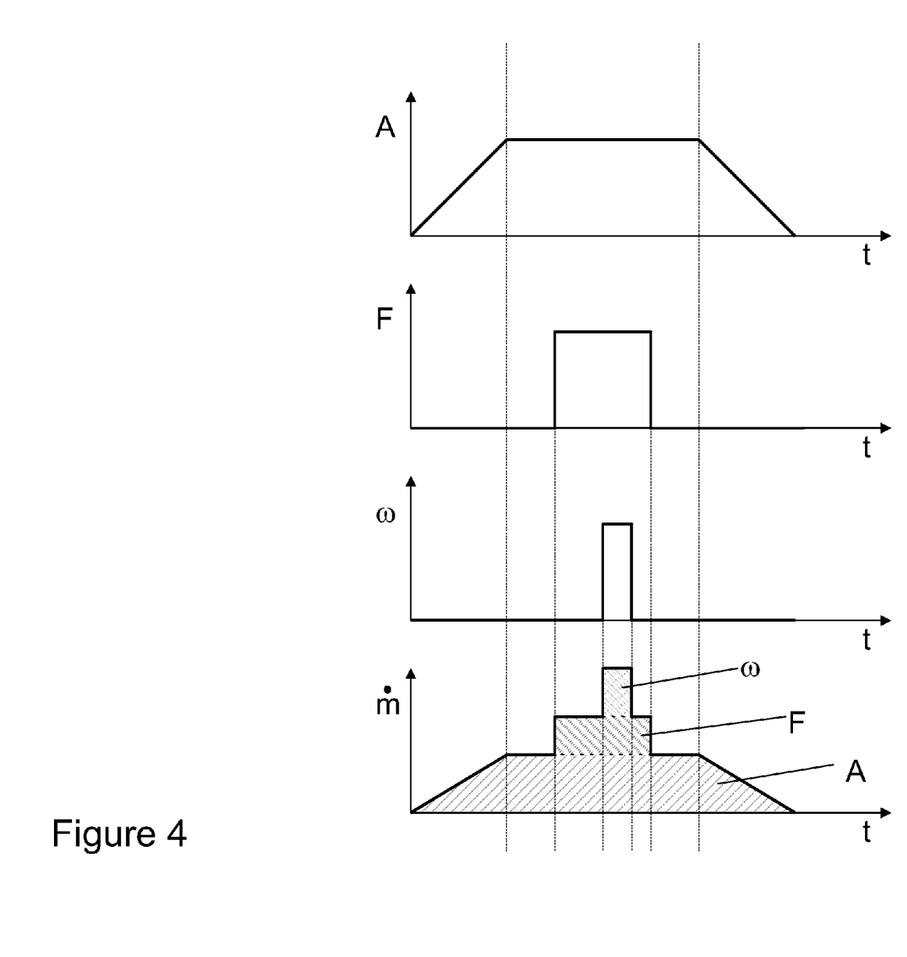
FIG. 4 shows graphs illustrating how the mass flow rate ṁ is influenced, respectively, by the aperture cross section A, the tapping frequency F, and the velocity ω of the rotary movement.

FIG. 4 represents an idealized time profile for the aperture cross-section A, a step increase of the tapping frequency F and a step increase of the angular velocity ω during a filling process. In an ideal case, superimposing these parameters on each other leads to the illustrated profile of the mass flow rate ṁ. This shows clearly that the mass flow rate ṁ is influenced by the aperture cross-section A, the tapping frequency F, as well as the angular velocity ω.

Although embodiments of the invention have been described by presenting specific exemplary embodiments, it is obvious that numerous further variants could be created based on a knowledge of the disclosed embodiments, for example by combining the features of the individual examples of embodiments with each other and/or by interchanging individual functional units between the embodiments.

What is claimed is:

1. A method of filling a target container with a predetermined target mass of a free-flowing substance from a reservoir using a dosage-dispensing device to fill the target container with measured doses of the substance, the dosage-dispensing device comprising a valve which allows the mass flow rate of the substance from the reservoir into the target container to be varied, a time-keeping device, a balance, and a controller unit to control the valve, the controller unit including an adjustment module in which a desired mass flow rate and a delay interval are stored; the method comprising the steps of:
   selecting the desired mass flow rate by performing the steps of:
      selecting a mass tolerance for the predetermined target mass; and
      selecting a desired mass flow rate that is directly proportional to the mass tolerance and inversely proportional to the delay interval;
   beginning a filling process by starting to measure elapsed time using the associated time-keeping device, starting to measure the mass of the substance present in the target container using the balance, and opening the valve, the balance transmitting a weighing signal to the controller unit; and
   adjusting the flow of the substance, at a predetermined elapsed time, by performing in the adjustment module, the substeps of:
      determining the mass flow rate;
      calculating a difference, if any, between the determined mass flow rate and the desired mass flow rate;
      calculating a mass flow adjustment, defined as a difference between the desired mass flow rate and the mass flow rate, and
      adjusting the mass flow rate based on the calculated difference, by increasing the mass flow rate by a mass flow rate adjustment if the determined mass flow rate is less than the desired mass flow rate and by decreasing the mass flow rate by the flow rate adjustment if the determined mass flow rate is greater than the desired mass flow rate.

2. The method of claim 1, wherein:
the flow adjusting step is performed repeatedly at equal time intervals.

3. The method of claim 1, wherein:
in the step of adjusting the mass flow rate, a weighing factor α, which varies between 0 and 1, is used, with the new mass flow rate being the sum of: the previous mass flow rate multiplied by the amount (1−α) and the mass flow rate adjustment multiplied by the amount α.

4. The method of claim 1, wherein:
in the step of adjusting the mass flow rate, the mass flow rate is determined from the time derivative of the weighing signal.

5. The method of claim 1, wherein:
the step of adjusting the mass flow rate includes the substep of opening or closing the valve responsive to a signal from the controller unit, where the valve comprises a housing, an outlet orifice with a circular aperture cross-section, and a shutter element, the outlet orifice and the shutter element being arranged on a common axis, the shutter element arranged to rotate about the common axis and to slide in translatory movement therealong, including sliding movement out of, and back into, the outlet orifice, the shutter element having a cylindrical shutter portion and an outlet passage portion, with the translatory movement of the shutter element effecting opening and closing of the valve.

6. The method of claim 5, wherein:
the valve is opened and closed with stepwise, equal length, translatory movements of the shutter element.

7. The method of claim 5, further comprising the step of:
in beginning the filling process, determining a minimum translatory displacement of the shutter element at which the substance begins to flow, and storing the amount of this minimum translatory displacement in memory accessible to the controller unit, for subsequent control of the mass flow rate.

8. The method of claim 5, further comprising the step of:
during the filling process, determining a maximum translatory displacement of the shutter element at which the substance ceases to flow, and storing the amount of the maximum translatory displacement in memory accessible to the controller unit, for subsequent control of the mass flow rate.

9. The method of claim 5, wherein:
the magnitude of the mass flow rate is directly correlated to the translatory displacement of the shutter element.

10. The method of claim 9, wherein:
the valve is opened and closed with stepwise, equal length, translatory movements of the shutter element.

11. The method of claim 10, further comprising the step of:
in beginning the filling process, determining a minimum translatory displacement of the shutter element at which the substance begins to flow, and storing the amount of this minimum translatory displacement in memory accessible to the controller unit, for subsequent control of the mass flow rate.

12. The method of claim 11, further comprising the step of:
during the filling process, determining a maximum translatory displacement of the shutter element at which the substance ceases to flow, and storing the amount of this maximum translatory displacement in memory accessible to the controller unit, for subsequent control of the mass flow rate.

13. A method of filling a target container with a predetermined target mass of a free-flowing substance from a reservoir using a dosage-dispensing device to fill the target container with measured doses of the substance, the dosage-dispensing device comprising a valve which allows the mass flow rate of the substance from the into the target container to be varied, a time-keeping device, a balance, and a controller unit to control the valve, the controller unit including an adjustment module in which a desired mass flow rate and a delay interval are stored, the method comprising the steps of:
 selecting the desired mass flow rate by performing the steps of:
  determining a mass tolerance for the predetermined target mass; and
  selecting a desired mass flow rate that is directly proportional to the mass tolerance and inversely proportional to the delay interval;
 beginning a filling process by starting to measure elapsed time using the associated time-keeping device, starting to measure the mass of the substance present in the target container using the balance, and opening the valve, the balance transmitting a weighing signal to the controller unit; and
 adjusting the flow of the substance, at a predetermined elapsed time, by performing in the adjustment module, the substeps of:
  determining the mass flow rate;
  calculating a difference, if any, between the determined mass flow rate and the desired mass flow rate;
  calculating a mass flow adjustment, defined as a difference between the desired mass flow rate and the mass flow rate, and
  adjusting the mass flow rate based on the calculated difference, by increasing the mass flow rate by a mass flow rate adjustment if the determined mass flow rate is less than the desired mass flow rate and by decreasing the mass flow rate by the flow rate adjustment if the determined mass flow rate is greater than the desired mass flow rate, adjusting the mass flow rate further includes the substep of opening or closing the valve responsive to a signal from the controller unit, where the valve comprises a housing, an outlet orifice with a circular aperture cross-section, and a shutter element, the outlet orifice and the shutter element being arranged on a common axis, the shutter element arranged to rotate about the common axis and to slide in translatory movement therealong, including sliding movement out of, and back into, the outlet orifice, the shutter element having a cylindrical shutter portion and an outlet passage portion, with the translatory movement of the shutter element effecting opening and closing of the valve; and
 the flow adjusting step is performed repeatedly at equal time intervals.

14. An apparatus for filling a target container with a predetermined target mass of a free-flowing substance from a reservoir, the apparatus comprising:
 a dosage-dispensing device, comprising a valve for providing variable flow therethrough of the substance from the reservoir to the target container, at a mass flow rate;
 a time-keeping device for determining an elapsed time from the beginning of the filling process;
 a balance for determining a mass of the substance that is present in the target container and sending a weighing signal, the weighing signal has a delay interval between the time when a mass arrives on the balance and the time when the amount present on the balance is indicated; and
 a controller unit for controlling the valve and for determining, at a predetermined elapsed time:
  a mass flow rate,
  a desired mass flow rate that is inversely proportional to the delay interval and directly proportional to the mass tolerance, and
  a flow rate adjustment, such that, if, at the elapsed time, the determined mass flow rate is less than the desired mass flow rate, the mass flow rate is increased by the flow rate adjustment, and that, if, at the elapsed time, the mass flow rate is greater than the desired mass flow rate, the mass flow rate is decreased by the flow rate adjustment, the controller unit comprising:
  an adjustment module; and
  a memory unit, associated with the adjustment module, for storing the desired mass flow rate and the mass tolerance.

15. The apparatus of claim 14, further comprising:
a housing for the valve;
an outlet orifice of the valve, having a circular cross-section; and a shutter element of the valve, the shutter element arranged on a common axis with the outlet orifice, the shutter element being rotatable about, and translatable along, the common axis relative to the housing and through the outlet orifice, the shutter element comprising a cylindrical shutter portion and an outlet passage portion, wherein axial translation of the shutter element opens and closes the valve.

16. The apparatus of claim 15, wherein:
the outlet passage portion has an variable aperture cross-section which directly correlates to the axial translation of the shutter element.

17. The apparatus of claim 15, wherein:
the shutter element rotates at a variable angular velocity which directly correlates to the mass flow rate of the stream of substance passing through the valve.

18. The apparatus of claim 16, further comprising:
an impact mechanism that directs taps of a variable tapping frequency against the valve while the valve is open, the tapping frequency directly correlating to the mass flow rate of the stream of substance passing through the valve.

19. The apparatus of claim 16, wherein:
the shutter element rotates at a variable angular velocity which directly correlates to the mass flow rate of the stream of substance passing through the valve.

20. The apparatus of claim 19, further comprising:
an impact mechanism that directs taps of a variable tapping frequency against the valve while the valve is open, the tapping frequency directly correlating to the mass flow rate of the stream of substance passing through the valve.

* * * * *